(12) United States Patent
Kadowaki

(10) Patent No.: US 7,321,693 B2
(45) Date of Patent: Jan. 22, 2008

(54) IMAGE PROCESSING APPARATUS AND IMAGE PROCESSING METHOD INCLUDING ADJUSTMENT OF CODED DATA TO SPECIFIED TARGET SIZE

(75) Inventor: Yukio Kadowaki, Nara (JP)

(73) Assignee: Ricoh Company, Ltd., Tokyo (JP)

( * ) Notice: Subject to any disclaimer, the term of this patent is extended or adjusted under 35 U.S.C. 154(b) by 587 days.

(21) Appl. No.: 10/695,473

(22) Filed: Oct. 27, 2003

(65) Prior Publication Data
US 2004/0136599 A1 Jul. 15, 2004

(30) Foreign Application Priority Data
Nov. 1, 2002 (JP) ............... 2002-319483

(51) Int. Cl.
G06K 9/36 (2006.01)
G06K 9/46 (2006.01)
G06K 9/48 (2006.01)
H04N 7/12 (2006.01)
H04N 1/32 (2006.01)
H04B 1/66 (2006.01)

(52) U.S. Cl. ............ 382/232; 375/240.18; 375/240.21; 375/240.24; 358/426.01

(58) Field of Classification Search ........ 382/239–240, 382/248–253, 232, 236, 244; 375/240.18–240.24; 358/426.01–426.16
See application file for complete search history.

(56) References Cited

U.S. PATENT DOCUMENTS

| | | | |
|---|---|---|---|
| 4,302,775 A * | 11/1981 | Widergren et al. | .... 375/240.06 |
| 4,958,311 A | 9/1990 | Kadowaki et al. | |
| 5,048,179 A | 9/1991 | Shindo et al. | |
| 5,252,917 A | 10/1993 | Kadowaki | |
| 5,517,108 A | 5/1996 | Kadowaki | |
| 5,611,021 A | 3/1997 | Kadowaki et al. | |
| 5,680,516 A | 10/1997 | Kadowaki et al. | |
| 5,742,801 A | 4/1998 | Fukushima et al. | |
| 5,748,786 A * | 5/1998 | Zandi et al. | ................ 382/240 |

(Continued)

FOREIGN PATENT DOCUMENTS

JP 2002-34043 1/2002

OTHER PUBLICATIONS

U.S. Appl. No. 10/247,896, to Kadowaki et al., filed Sep. 20, 2002.

(Continued)

Primary Examiner—Ishrat Sherali
Assistant Examiner—Manav Seth
(74) Attorney, Agent, or Firm—Cooper & Dunham LLP

(57) ABSTRACT

An image processing apparatus and an image processing method are disclosed for generating coded data having a desired data size at a high speed. The image processing apparatus includes a coding part, two memories, a setting part and a data size adjustment part. The coding part partitions a wavelet coefficient of image data into bit-planes and generates coded data of the image data through entropy coding on the wavelet coefficient for each of the bit-planes. The data size adjustment part adjusts a size of the coded data such that the size falls within an acceptable range including the target size set by the setting part by sequentially discarding a portion of the coded data in a least significant order based on the size of the coded data portion corresponding to each of the bit-planes.

10 Claims, 10 Drawing Sheets

U.S. PATENT DOCUMENTS

| | | | |
|---|---|---|---|
| 5,794,067 A | | 8/1998 | Kadowaki |
| 5,815,097 A | * | 9/1998 | Schwartz et al. .............. 341/51 |
| 5,881,176 A | * | 3/1999 | Keith et al. ................. 382/248 |
| 5,918,253 A | | 6/1999 | Kadowaki |
| 6,052,205 A | * | 4/2000 | Matsuura .................... 382/232 |
| 6,066,978 A | | 5/2000 | Kadowaki |
| 6,125,201 A | * | 9/2000 | Zador ........................ 382/166 |
| 6,144,773 A | * | 11/2000 | Kolarov et al. ............. 382/240 |
| 6,307,971 B1 | * | 10/2001 | Persiantsev et al. ........ 382/236 |
| 6,658,159 B1 | * | 12/2003 | Taubman .................... 382/240 |
| 2003/0039400 A1 | * | 2/2003 | Launiainen ................. 382/240 |
| 2003/0113027 A1 | * | 6/2003 | Chan et al. ................. 382/240 |
| 2003/0219166 A1 | * | 11/2003 | Schwartz et al. ........... 382/251 |

OTHER PUBLICATIONS

Yasuyuki Nomizu (2001), "Next-Generation Image Coding Method JPEG2000", Triceps, pp. 9-31 and 46-127 and English abstract attached hereto.

* cited by examiner

INTERLACED IMAGE A (FIELD 0)

AFTER 1/60 SECOND

INTERLACED IMAGE B (FIELD 1)

NON-INTERLACED IMAGE (INTERLACED IMAGE A + INTERLACED IMAGE B)

TOOTH-SHAPED DISTORTION

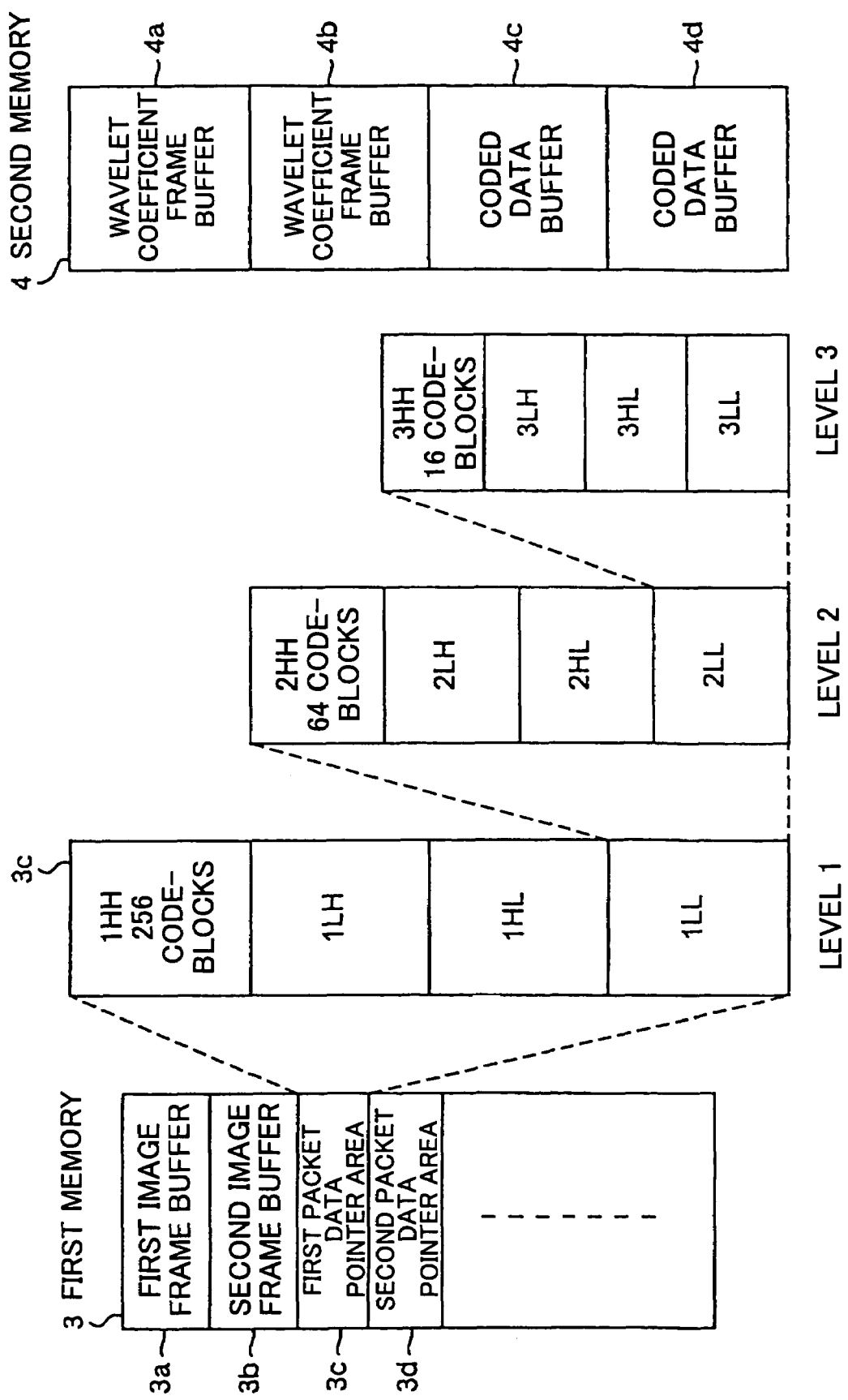

SCANNING ORDER:
3LL->3HL->3LH->3HH->2HL->2LH->2HH->1HL->1LH->1HH

IMAGE PROCESSING APPARATUS AND IMAGE PROCESSING METHOD INCLUDING ADJUSTMENT OF CODED DATA TO SPECIFIED TARGET SIZE

BACKGROUND OF THE INVENTION

1. Field of the Invention

The present invention generally relates to an image processing apparatus and an image processing method, and more particularly to an image processing apparatus and an image processing method that encode image data by performing frequency transformation, for example, in accordance with JPEG (Joint Photographic Experts Group) 2000 standard.

2. Description of the Related Art

The JPEG2000 standard is well-known by those skilled in the art as one of image compression coding methods suitable for a high-definition image ("Next-Generation Image Coding Method JPEG2000", Yasuyuki Nomizu, 2001, Triceps).

In image processing based on the JPEG2000 format, wavelet coefficients are obtained through two-dimensional discrete wavelet transformation. Then, the wavelet coefficients are decomposed into a plurality of bit-planes, and the least significant bit-plane data are discarded in a unit of subband. In this fashion, it is possible to adjust (decrease) the size of coded data that result form entropy coding on the wavelet coefficients.

According to the conventional JPEG2000 based image processing, however, when wavelet coefficients are entropy encoded, the data cannot be necessarily compressed at a constant data size. Accordingly, it is necessary to repeat the following process until the resulting coded data reaches to a desired size. Namely, the least significant bit-plane data of the wavelet coefficients are discarded, the remaining data of the wavelet coefficients are entropy coded, and the size of the resulting coded data is checked again. In general, it takes a large computation time to perform entropy coding because of a large amount of processed data. Thus, the above-mentioned conventional image processing method requires a large time to decrease (compress) coded data to a desired size.

SUMMARY OF THE INVENTION

It is a general object of the present invention to provide an image processing apparatus and an image processing method in which one or more of the above-mentioned problems are eliminated.

A more specific object of the present invention is to provide an image processing apparatus that can generate coded data having a desired size at a high speed.

In order to achieve the above-mentioned objects, there is provided according to one aspect of the present invention an image processing apparatus, including: a coding part partitioning a wavelet coefficient obtained by performing two-dimensional discrete wavelet transform on image data into bit-planes and generating coded data of the image data by performing entropy coding on the wavelet coefficient for each of the bit-planes; a first memory accommodating a size of a coded data portion generated from the wavelet coefficient for each of the bit-planes through the execution of the entropy coding; a second memory accommodating the coded data of the image data; a setting part setting a target size of the coded data; and a data size adjustment part adjusting the size of the coded data such that the size of the coded data falls within an acceptable range including the target size set by the setting part by sequentially discarding a portion of the coded data in a least significant order from the second memory based on the size of the coded data portion corresponding to each of the bit-planes in the first memory.

In an embodiment of the present invention, the image processing apparatus may be based on JPEG2000.

In an embodiment of the present invention, the coding part may partition the wavelet coefficient into bit-planes for each code-block formed of a predetermined pixel matrix and generate the coded data of the image data by performing entropy coding on the wavelet coefficient for each of the bit-planes in accordance with the JPEG2000; the first memory may accommodate a storage address of a coded data portion corresponding to each code-block and a size of a coded data portion corresponding to each coding pass for each of the bit-planes of each code-block with respect to the coded data stored in the second memory; and the data size adjustment part may adjust the size of the coded data such that the size of the coded data falls within an acceptable range including the target size of the coded data set by the setting part by subsequently discarding a portion of the coded data in a least significant order from the second memory based on the size of the coded data portion corresponding to each coding pass stored in the first memory.

Additionally, there is provided according to another aspect of the present invention an image processing method, including: a coding step of partitioning a wavelet coefficient obtained by performing two-dimensional discrete wavelet transform on image data into bit-planes and generating coded data of the image data by performing entropy coding on the wavelet coefficient for each of the bit-planes; a first storage step of accommodating a size of a coded data portion generated from the wavelet coefficient for each of the bit-planes through the execution of the entropy coding in a first memory; a second storage step of accommodating the coded data of the image data in a second memory; a setting step of setting a target size of the coded data; and a data size adjustment step of adjusting the size of the coded data such that the size of the coded data falls within an acceptable range including the target size set by the setting step by sequentially discarding a portion of the coded data in a least significant order from the second memory based on the size of the coded data portion corresponding to each of the bit-planes in the first memory.

In an embodiment of the present invention, the image processing method may be based on a JPEG2000.

In an embodiment of the present invention, the coding step may partition the wavelet coefficient into bit-planes for each code-block formed of a predetermined pixel matrix and generate the coded data of the image data by performing entropy coding on the wavelet coefficient for each of the bit-planes in accordance with the JPEG2000; the first storage step may accommodate a storage address of a coded data portion corresponding to each code-block and a size of a coded data portion corresponding to each coding pass for each of the bit-planes of each code-block with respect to the coded data stored in the second memory; and the data size adjustment step may adjust the size of the coded data such that the size of the coded data falls within an acceptable range including the target size of the coded data set by the setting step by subsequently discarding a portion of the coded data in a least significant order from the second memory based on the size of the coded data portion corresponding to each coding pass stored in the first memory.

According to one aspect of the present invention, coded image data before size adjustment are stored in the first memory, and a portion of the coded data are being gradually discarded corresponding to each plane-bit from the first memory until the resulting size of the coded data reaches a target data size. While conventional image processing apparatuses repeat to discard the least significant bit-plane data and perform a conventional coding process on the resulting coded data, an inventive image processing apparatus can generate coded data of the target size without repetition of coding. As a result, it is possible to obtain the target sized coded data at a higher speed.

Other objects, features and advantages of the present invention will become more apparent from the following detailed description when read in conjunction with the accompanying drawings.

BRIEF DESCRIPTION OF THE DRAWINGS

FIG. 4 is a diagram illustrating exemplary memory maps of first and second memories of the image processing apparatus according to the embodiment;

DETAILED DESCRIPTION OF THE PREFERRED EMBODIMENTS

In the following, embodiments of the present invention will be described with reference to the accompanying drawings.

First, an overview of an image processing apparatus according to the present invention is provided. An image processing apparatus according to an embodiment of the present invention, which complies with, for example, JPEG2000, processes a non-interlaced image that results from composition of two underlying interlaced images. In entropy coding (including coefficient modeling and arithmetic coding) on wavelet coefficients that result from two-dimensional discrete wavelet transform for the purpose of frequency transformation on image data of the non-interlaced image, the image processing apparatus maintains not only the entropy coded data but also the size of coded data corresponding to individual coding passes in a unit of code-block. Then, coded data corresponding to the coding passes are sequentially being discarded from the least significant bit-plane for each code-block in the least significance order of bit-planes without repeatedly performing entropy coding until the size of the coded image data falls an acceptable range depending on a predefined data size or compression rate. Then, the image processing apparatus supplies the coded image data, which have the desired data size or compression rate, in form of packet data based on the JPEG2000 to an external apparatus. In this manner, the image processing apparatus can obtain coded image data having a target data size by performing time-consuming entropy coding only once. Thus, the image processing apparatus according to the present invention can operate at a higher speed than conventional image processing apparatuses that needs to repeat the entropy coding.

Figure 1:
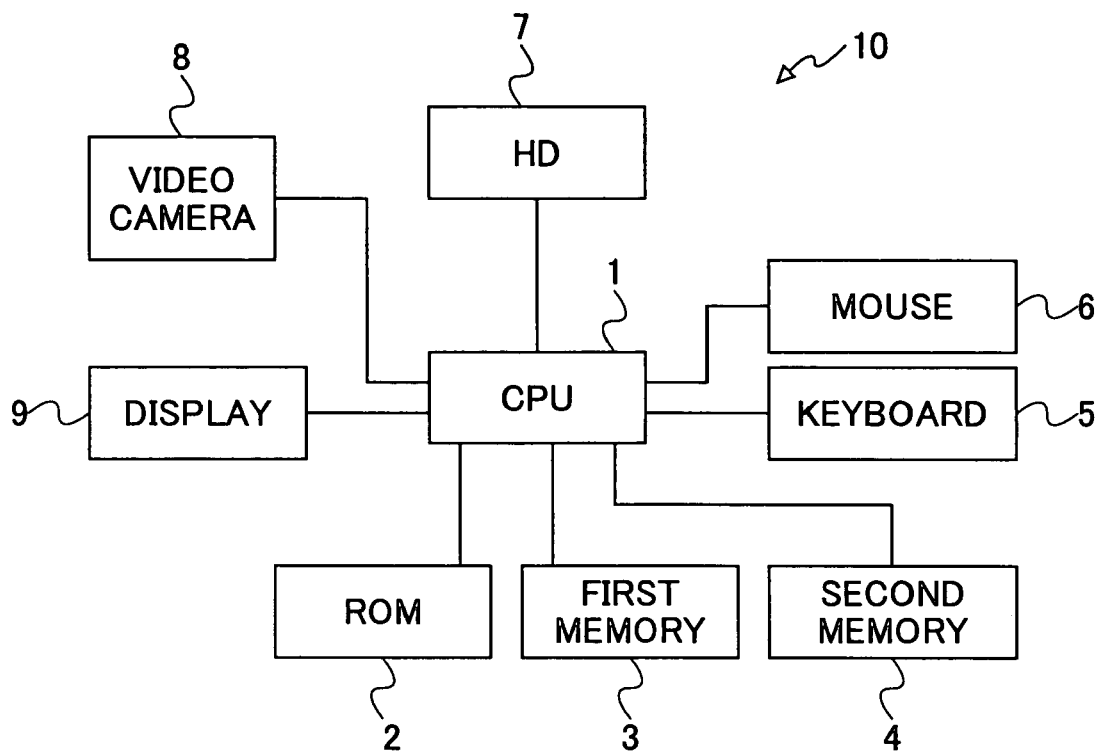
FIG. 1 is a diagram illustrating an exemplary configuration of an image processing apparatus according to an embodiment of the present invention.

A description is given, with reference to FIG. 1, of a structure of an image processing apparatus according to an embodiment of the present invention. FIG. 1 shows an exemplary configuration of an image processing apparatus 10 according to an embodiment of the present invention.

Referring to FIG. 1, the image processing apparatus 10 comprises a CPU (Central Processing Unit) 1, a ROM (Read Only Memory) 2, a first memory 3, a second memory 4, a keyboard 5, a mouse 6, a HD (Hard Disk) 7, a video camera 8 and a display 9. ROM 2 is used to maintain a program to process images. The first and second memories 3 and 4 are used during execution of the program. The keyboard 5 and the mouse 6 serve as man-machine interfaces. After coding of images captured by the video camera 8, coded image data are stored in HD 7.

Figure 2:
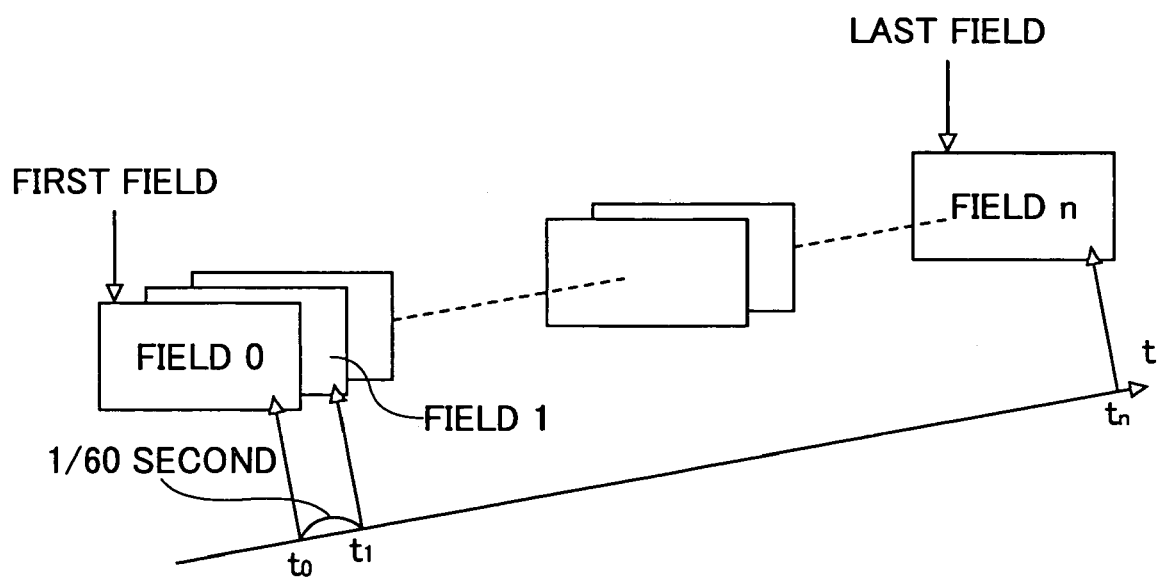
FIG. 2 is a diagram illustrating interlaced images of a series of fields 0 through n captured by a video camera of the image processing apparatus according to the embodiment.

A description is given, with reference to FIG. 2 through FIG. 11, of an operation of the image processing apparatus 10 according to the embodiment of the present invention. FIG. 2 shows interlaced images of a series of fields 0 through n taken by means of the video camera 8.

Referring to FIG. 2, the video camera 8 scans an image of the field 0 in an interlaced fashion, as appreciated by those skilled in the art, at the first captured time $t_0$ (second) and subsequently scans an image of the field 1 in the interlaced fashion at the second captured time $t_0+1/60$ (second). Then, the video camera 8 is sequentially scanning n images per 1/60 (second) until the last captured time $t_n$.

Figure 3A:
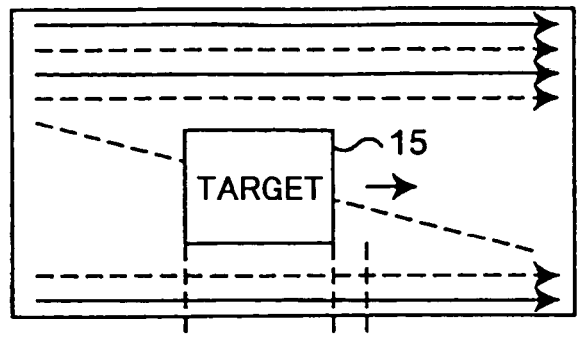
FIGS. 3A through 3C are diagrams illustrating a non-interlaced image generated from underlying interlaced images A and B that are consecutively captured by the video camera.
Figure 3B:
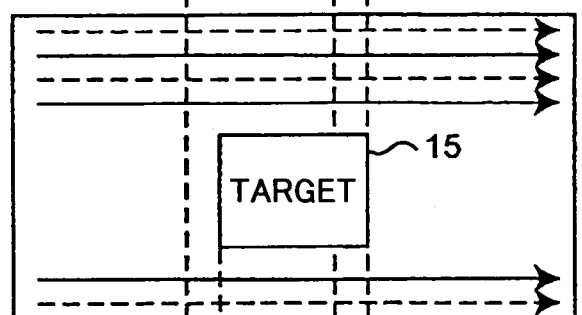
Figure 3C:
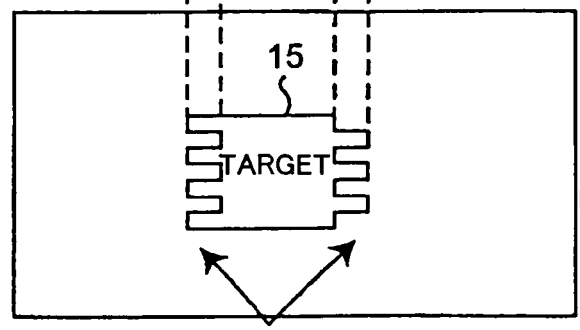

FIGS. 3A through 3C show a non-interlaced image generated from interlaced images A and B of the fields 0 and 1, respectively, that are consecutively captured by the video camera 8. According to the interlaced scanning fashion, the interlaced image A is generated by scanning odd pixel lines (illustrated as solid lines in FIG. 3A) at the captured time $t_0$, and on the other hand, the interlaced image B is generated by scanning even pixel lines (illustrated as solid lines in FIG. 3B) at the captured time $t_1$ ($=t_0+1/60$), as appreciated by those skilled in the art. In the interlaced images shown in FIGS. 3A and 3B, a target 15 is moving in the right direction, which may be the left direction in another case, during the 1/60 second. In this case, as shown in FIG. 3C, a tooth-shaped distortion, of which height corresponds to several pixels, occurs at both ends of the non-interlaced image generated from the underlying interlaced images A and B.

In the illustrated example, the non-interlaced image is formed in such a way that each scanning line of the underlying interlaced images A and B is alternately arranged, in other words, the interlaced images A and B are complemented each other.

FIG. 4 shows exemplary memory maps of the first and second memories 3 and 4. Referring to FIG. 4, non-interlaced image data generated from two consecutively read interlaced images are stored in a first image frame buffer 3a of the first memory 3. During coding of the non-interlaced image data in the first image frame buffer 3a, two newly-captured interlaced images are being written in a second image frame buffer 3b of the second memory 4. In this fashion, each pair of interlaced images captured by the video camera 8 are alternately written in the first and second image frame buffers 3a and 3b.

CPU 1 of the image processing apparatus 10 performs JPEG2000-based coding on the non-interlaced image data written in the first image frame buffer 3a. At this time, CPU 1 stores wavelet coefficients resulting from the coding in a wavelet coefficient frame buffer 4a in the second memory 4, and writes coded data of the non-interlaced image data in a coded data buffer 4c. Furthermore, CPU 1 decomposes the wavelet coefficients into a predetermined number of code-blocks, and then writes information associated with sizes of coding passes of each code-block in a first packet data pointer area 3c in the first memory 3.

The first packet data pointer area 3c maintains data that are generated per code-block comprising a matrix of 64×64 pixels. As shown in FIG. 4, a packet data pointer in the first packet data pointer area 3c includes 1HH, 1LH, 1HL, 2HH, 2LH, 2HL, 3HH, 3LH, 3HL and 3LL that result from level-3 wavelet transform. For each of 1HH, 1LH and 1HL, 256 data sets are prepared. For each of 2HH, 2LH and 2HL, 64 data sets are prepared. For each of 3HH, 3LH, 3HL and 3 LL, 16 data sets are prepared.

As shown in FIG. 4, the second memory 4 comprises wavelet coefficient frame buffers 4a and 4b, and coded data buffers 4c and 4d. The wavelet coefficient frame buffer 4a is used to store wavelet coefficients obtained by performing level-3 two dimensional discrete wavelet transform on non-interlaced image data in the first image frame buffer 3a. The wavelet coefficient frame buffer 4b is used to store wavelet coefficients obtained by performing level 3 two-dimensional discrete wavelet transform on non-interlaced image data in the second image frame buffer 3b. The coded data buffers 4c and 4d are used to store coded image data that result from coding based on the wavelet coefficients in the wavelet coefficient frame buffers 4a and 4b, respectively.

The image processing apparatus 10 according to the present invention is basically implemented in accordance with the following two main processes: a coding process and a coding data size adjustment process.

A description is give, with reference to FIG. 5 through FIG. 8, of an exemplary coding process performed by the image processing apparatus 10.

Figure 5:
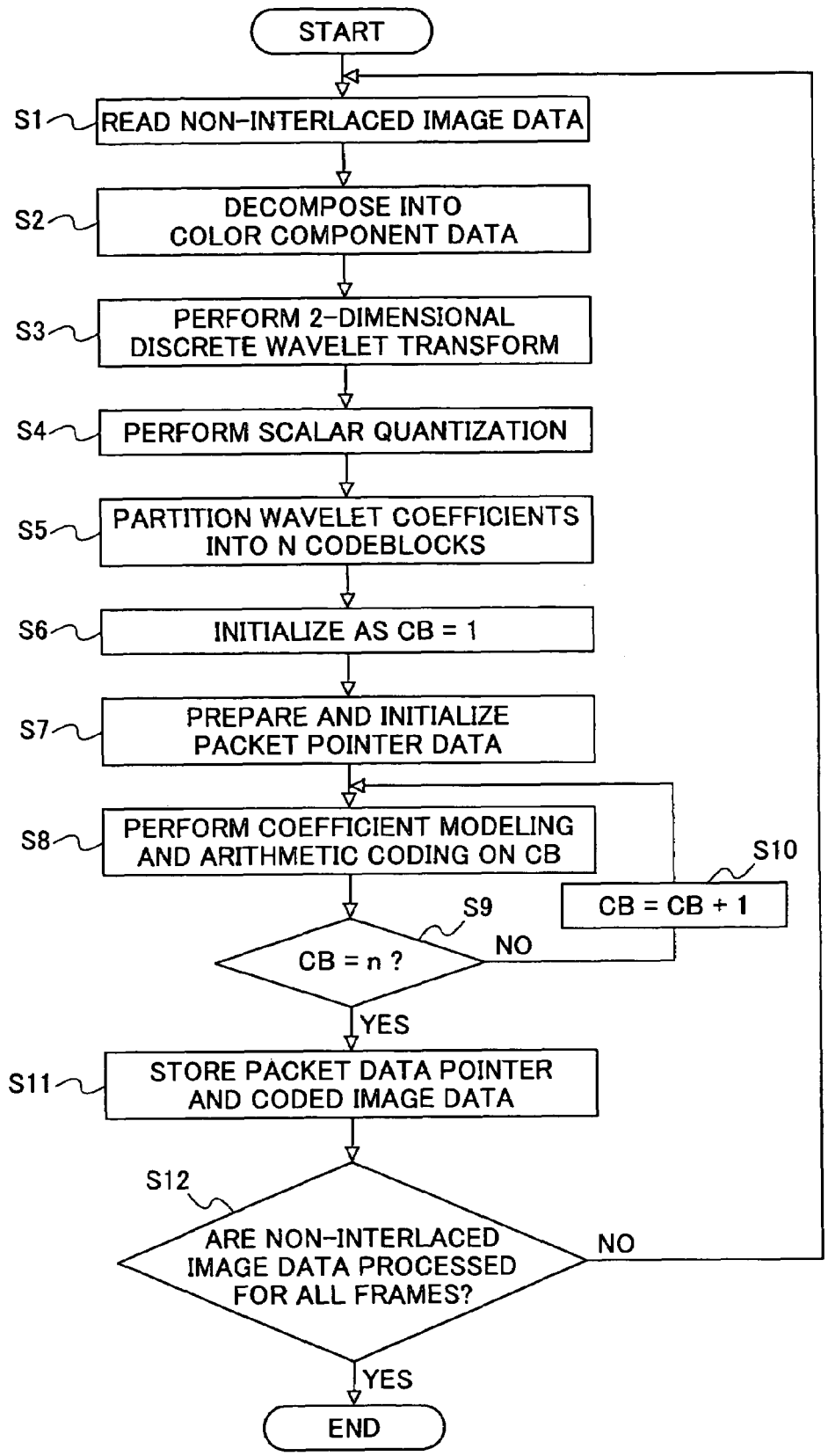
FIG. 5 is a flowchart of an exemplary coding process performed by the image processing apparatus according to the embodiment.

FIG. 5 is a flowchart of an exemplary coding process executed by CPU 1 of the image processing apparatus 10 wherein the coding process is performed based on the JPEG2000.

Referring to FIG. 5, non-interlaced image data are read from the first image frame buffer 3a in the first memory 3 at step S1.

At step S2, the read non-interlaced image data are decomposed into color component data of Y, Cr and Cb. These color component data are processed in parallel in accordance with the same procedure. For clarity of explanation, only the color component data of Y are described below.

At step S3, CPU 1 performs level-3 two-dimensional discrete wavelet transform on the Y color component data, and writes obtained wavelet coefficients in the wavelet coefficient frame buffer 4a in the second memory 4.

At step S4, the wavelet coefficients are scalar-quantized in accordance with the JPEG2000, and then the wavelet coefficients in the wavelet coefficient frame buffer 4a are updated to the scalar-quantized wavelet coefficients.

Figure 6:
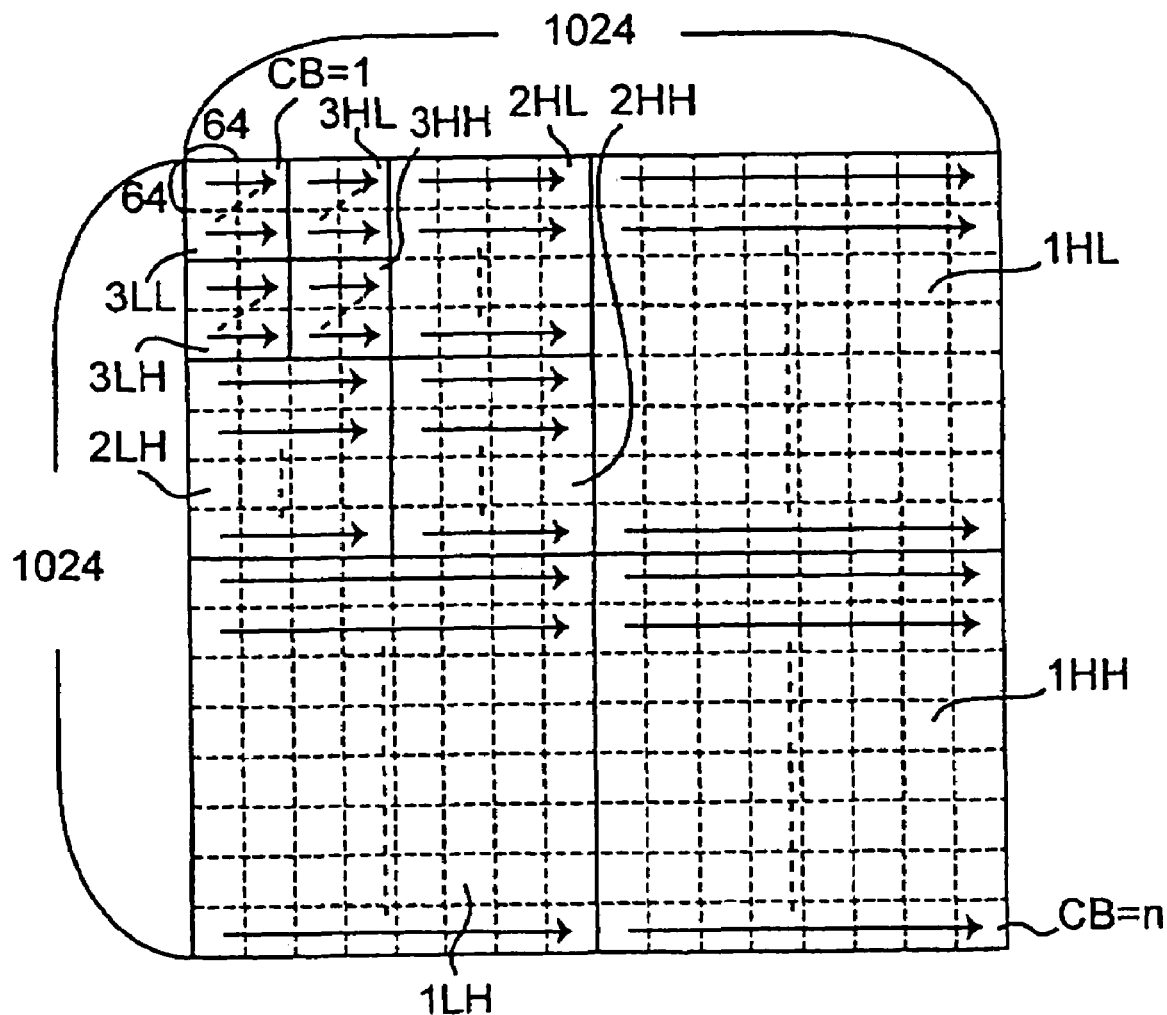
FIG. 6 is a diagram illustrating exemplary partition of wavelet coefficients into code-blocks.

At step S5, the scalar-quantized wavelet coefficients are partitioned into n code-blocks as illustrated in FIG. 6. Within each subband of 3LL, 3HL, 3LH, 3HH, 2HL, 2LH, 2HH, 1HL, 1LH and 1HH, code-blocks are ordered in a raster scanning fashion, as appreciated by those skilled in the art.

At step S6, a variable CB to indicate a currently processed code-block is initialized as 1.

Figure 7:
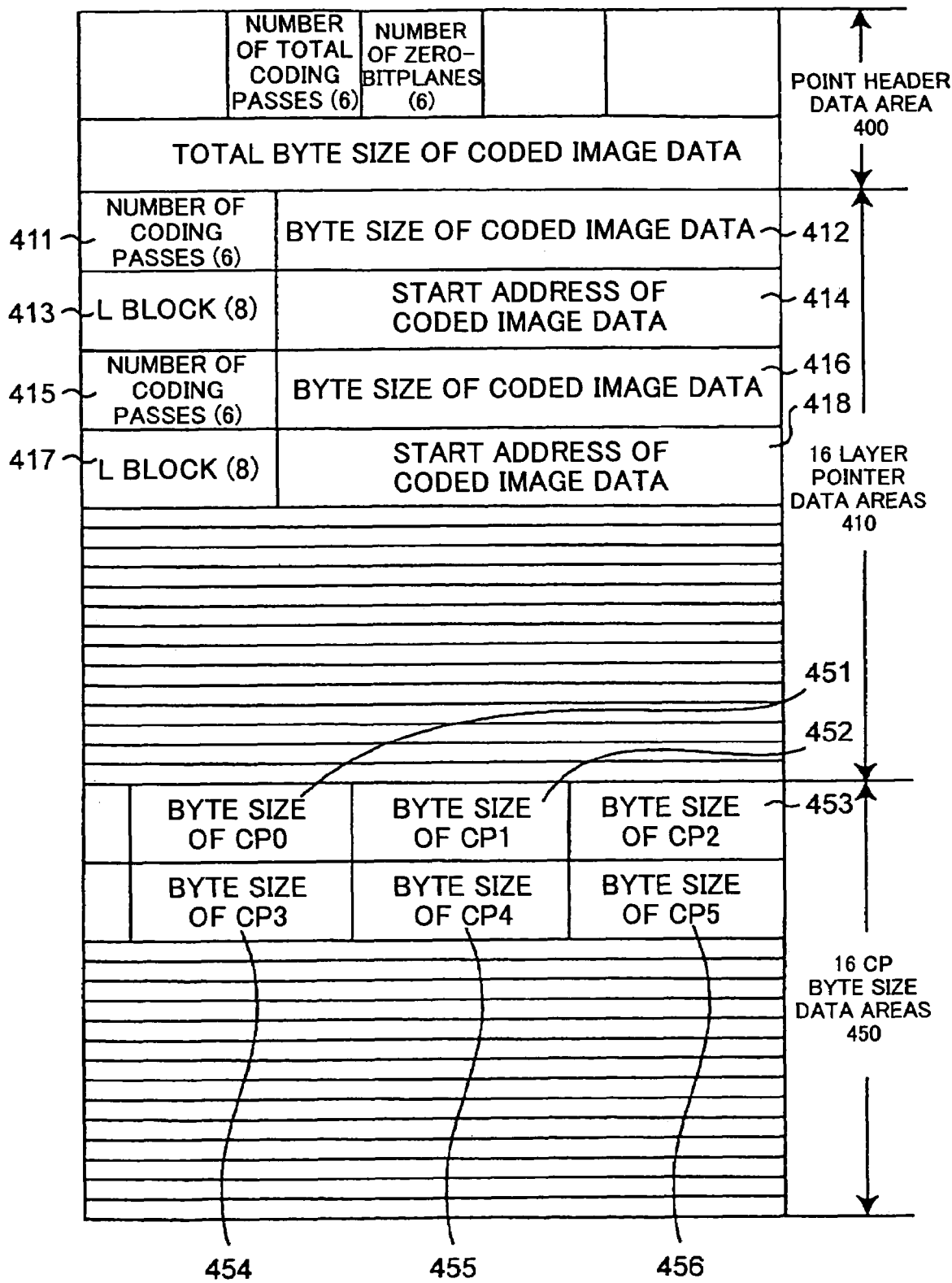
FIG. 7 is a diagram illustrating an exemplary data structure of a packet data pointer in the image processing apparatus according to the embodiment.

At step S7, a storage area for a packet data pointer of the code-block CB, as illustrated in FIG. 7, is prepared in the first packet data pointer area 3c in the first memory 3. The storage area is partitioned into a point header data area 400, a layer pointer data area 410 and a CP byte size data area 450. Then, the point header data area 400 and the layer pointer data area 410 are initialized by writing initial data therein. According to the image processing apparatus 10, since a bit-plane is considered as a layer, a code-block has 16 layers. Also, the point header information includes the number of total coding passes and the number of bit-planes of zero bit, which can be identified before execution of coefficient modeling described below.

Figure 8:
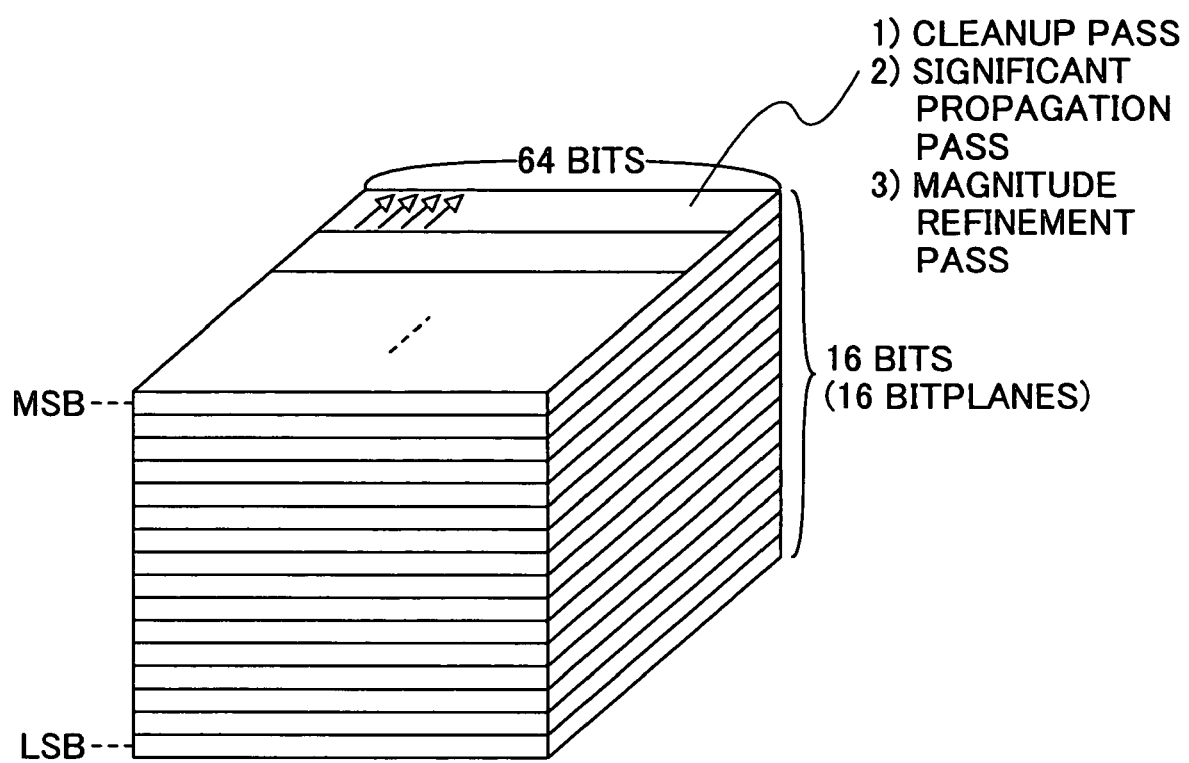
FIG. 8 is a diagram explaining coefficient modeling on bit-planes of a code-block.

At step S8, coefficient modeling and arithmetic coding are performed on a wavelet coefficient of the code-block CB as entropy coding prescribed by the JPEG2000. According to the coefficient modeling, the wavelet coefficient of the code-block CB, which comprises 16 bit data of the 64×64 pixel matrix, is decomposed into 16 bit-planes, as illustrated in FIG. 8. Then, a 3×3 pixel neighbor process, which comprises a cleanup pass, a significant propagation pass and a magnitude refinement pass based on the JPEG2000, is performed on each bit-plane, and subsequently the arithmetic coding is performed, as appreciated by those skilled in the art. After completion of the coefficient modeling and arithmetic coding, a packet data pointer in the first packet data pointer area 3c is updated in accordance with a procedure described below, and coded image data are written in the coded data buffer 4c in the second memory 4.

Specifically, as illustrated in FIG. 7, the number of bytes of the coded image data is written in a coded image data byte size area 412 of the layer pointer data area 410, L block data (8 bit) indicative of the effective bit length of the coded image data are written in an L block data area 413. Address data (start address) of the coded image data in the coded data buffer 4c are written as the start address 414 of the coded image data. A size of coded data corresponding to each of the above-mentioned three coding passes is written in a CP0 byte data written area 451, a CP1 byte data written area 452 or a CP2 byte data written area 453 corresponding to the coding pass. It is noted that the end address of the coded image data can be determined based on both the start address 414 and the size of the coded image data associated with the coded data byte size data 412 and the L block data 413. For this reason, it is possible to gradually reduce the size of the coded image data by discarding the coded image data obtained through the final coding pass of the least significant bit-plane (layer) in a coded data size adjustment process, which is described below.

Next, if the variable CB is not equal to n (step S9: NO), the variable CB is incremented by 1 at step S10 and the process control returns to step S8. On the other hand, if the variable CB is equal to n (step S9: YES), CPU 1 stores in HD 7 the packet data pointer in the first packet data pointer area 3c and the coded image data in the coded data buffer 4c at step S11.

At step S12, it is determined whether or not non-interlaced image data have been processed for all frames. If there remains a frame of the non-interlaced image data that are not processed (step S12: NO), the process control returns to step S1 and the above-mentioned procedure is repeated. In this case, the next non-interlaced image data are read from the second image frame buffer 3b at step S1, and wavelet coefficients in the wavelet coefficient frame buffer 4b are processed at step S5. Also, a packet data pointer and coded image data of the non-interlaced image data are written in the second packet data pointer area 3d and the coded data buffer 4d, respectively, at steps S7 and S8.

For the next or the subsequent non-interlaced image data to be processed, the non-interlaced image data are read from the first image frame buffer 3a and the second image frame buffer 3b alternately. Also, data are alternately processed between the packet data pointer areas 3c and 3d, the wavelet coefficient buffers 4a and 4b, and the coded data buffers 4c and 4d.

On the other hand, if non-interlaced image data have been processed for all frames captured by the video camera 8 (step S12: YES), CPU 1 terminates the coding process.

Figure 9:
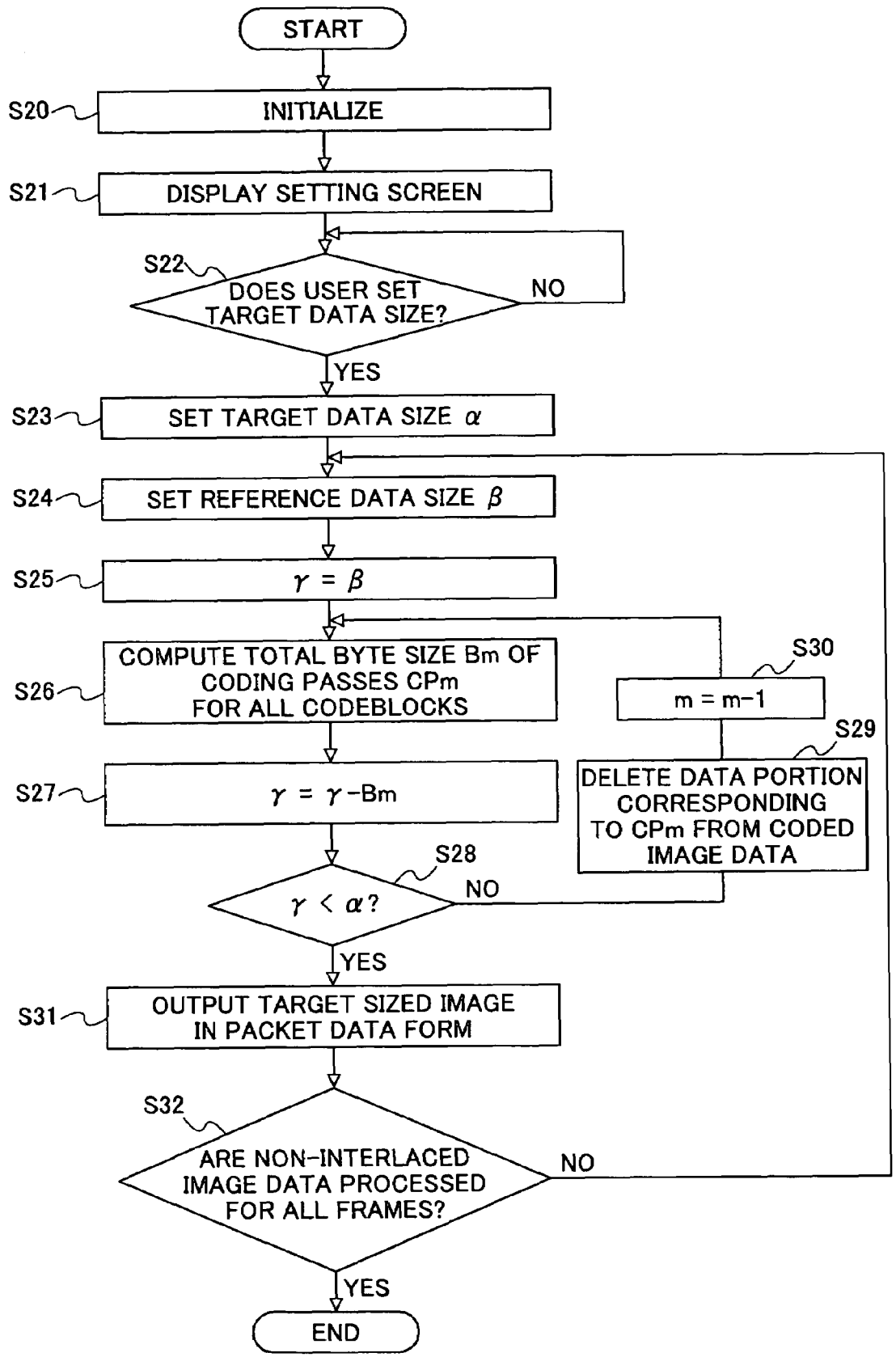
FIG. 9 is a flowchart of a coded image data size adjustment process performed by the image processing apparatus according to the embodiment.
Figure 10:
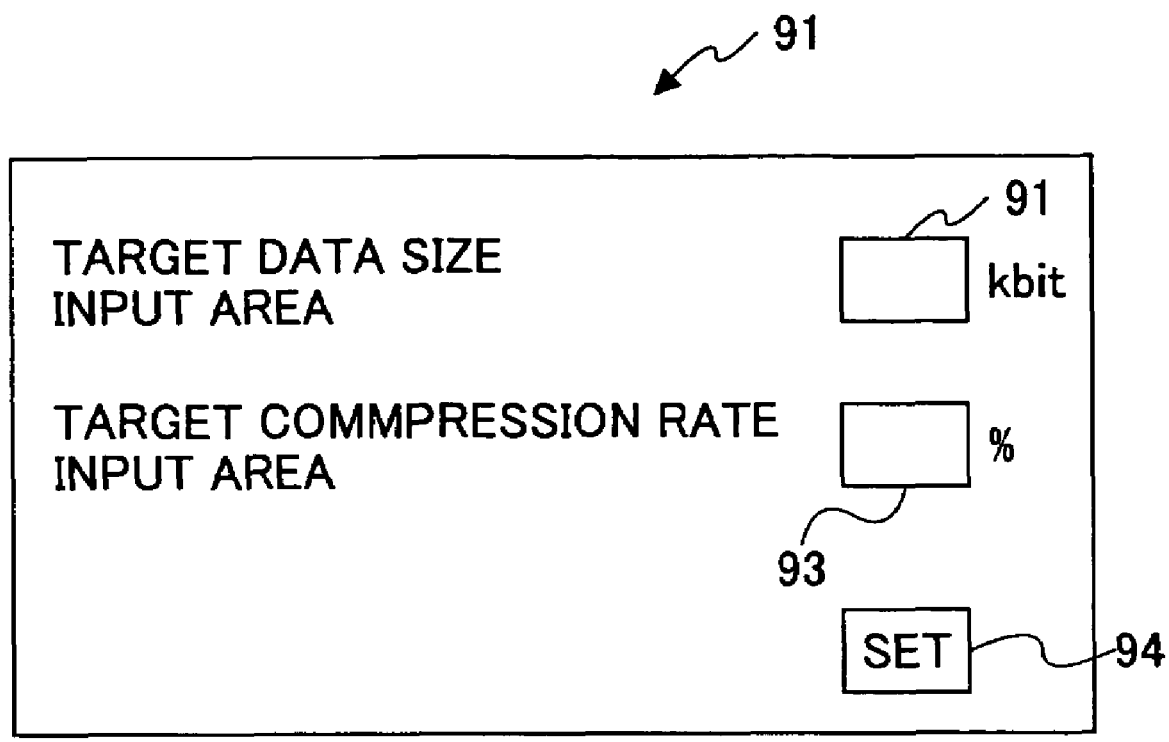
FIG. 10 is a diagram illustrating an exemplary compression setting screen.
Figure 11:
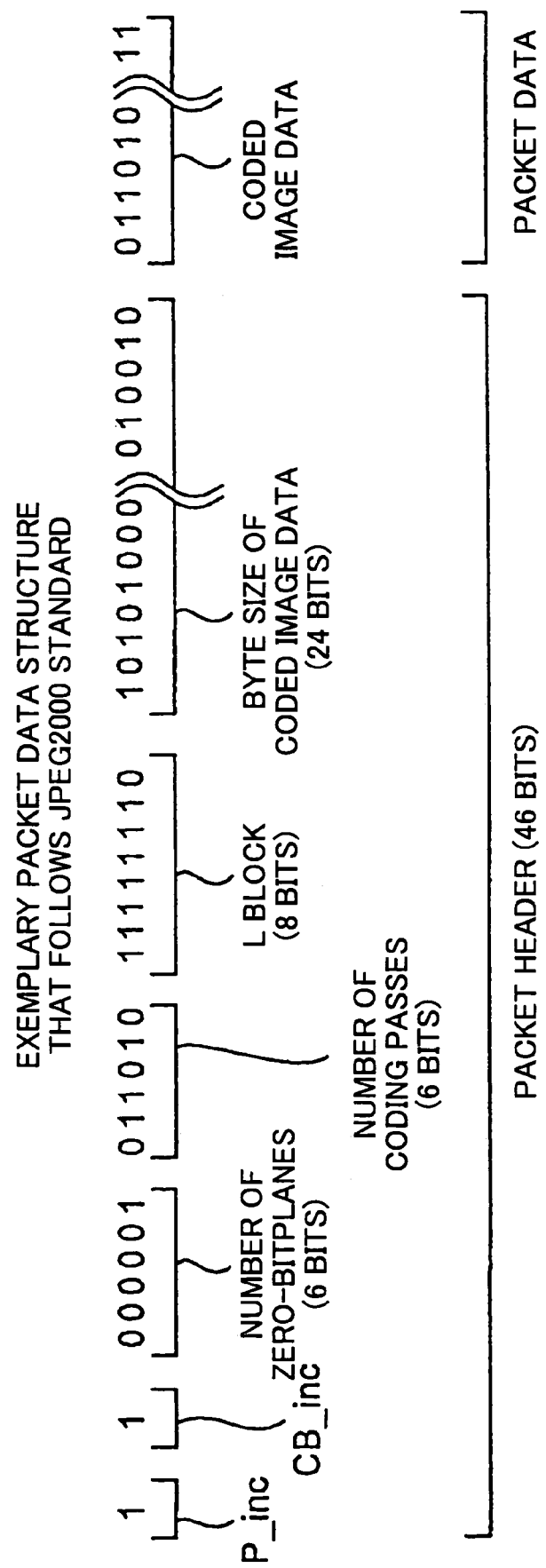
FIG. 11 is a diagram illustrating an exemplary JPEG2000 compliant packet data structure.

A description is given, with reference to FIG. 9 through FIG. 11, of an exemplary coded image data size adjustment process executed by the image processing apparatus 10 according to the present invention. The coded image data size adjustment process may be performed immediately after completion of the above-mentioned coding process. Alternatively, the coded image data size adjustment process may be started at an arbitrary timing designated by a user.

FIG. 9 is a flowchart of the coded image data size adjustment process according to the present invention.

Referring to FIG. 9, a variable m is initially set as the total number of coding passes in a currently processed code-block, that is, 48=3 (the three passes)×16 (16 bit-planes) at step S20.

At step S21, a setting screen, as illustrated in FIG. 10, is displayed on the display 9.

At step S22, CPU 1 waits until a user inputs a target data size (Kbit) in a target data size input area 92 or a target compression rate (%) in a target compression rate input area 93 for currently processed coded image data and presses a setting button 94 via the keyboard 5 or the mouse 6.

If the user designates the target data size or the target compression rate for the coded image data and presses the setting button 94 (step S22: YES), CPU 1 sets a target data size a based on the given input value at step S23.

At step S24, CPU 1 reads coded image data of the first frame, which is referred to as a reference coded image data hereinafter, from HD 7 and then sets the size of the reference coded image data as a reference data size β.

At step S25, CPU 1 sets the content of a variable γ as β.

At step S26, CPU 1 reads from HD 7 the byte sizes (data sizes) of coding passes CPm (=CP48) of the least significant bit layers for all n code-blocks, and then computes the total byte size Bm of the coding passes CPm.

At step S27, CPU 1 subtracts the total byte size Bm from the current value γ.

At step S28, it is determined whether or not the subtracted value γ is less than the target data size α. If the subtracted value γ is greater than or equal to the target data size α (step S28: NO), the process control moves to step S29.

At step S29, CPU 1 deletes data portion corresponding to the coding pass CPm from the coded image data.

At step S30, CPU 1 decrements the variable m by 1, and then returns to step S26.

On the other hand, if the subtracted value y is lower than the target data size α (step S28: YES) the process control moves to step S31.

At step S31, CPU 1 outputs target sized image data in form of packet data that follows the JPEG2000 standard, as illustrated in FIG. 11. Such packet form image data comprise P_inc, CB_inc, the number of zero-bit-planes, the number of coding passes, an L block, the byte size of the coded image data, and the coded image data. Here, each of the P_inc and the CB_inc occupies 1 bit of the packet form image data. The zero-bit-plane number, which is stored in the point header area 400 in FIG. 7, occupies 6 bits. The coding pass number, which is stored in the coding pass area 411, occupies 6 bits. The L block, which is indicative of the bit length of the coded image data, occupies 8 bits. The byte size of the coded image data occupies 24 bits.

Alternatively, an acceptable range of about 1 Kbit may be set for the determination of step S28, and if the subtracted value γ is lower than (α+1) Kbit, CPU 1 may determine that the coded data image reaches the target data size. After completion of step S31, the process control moves to step S32.

At step S32, it is determined whether or not coded image data have been processed for all frames captured by the video camera 8. If there are some coded data that are not processed (step S32: NO), the process control moves to step S24 and reads coded image data of the next frame. On the other hand, if coded image data have been processed for all frames (step S32: YES), CPU 1 terminates the coded image data size adjustment process.

As mentioned above, the image processing apparatus 10 temporarily stores image data captured by the video camera 8 in HD 7 after completion of the coding process in FIG. 5, and performs the coded image data size adjustment process in FIG. 9 immediately in response to the completion of the coding process or in response to receipt of user's instruction to execute the coded image data size adjustment process. While conventional image processing apparatuses repeat to delete the least significant bit-plane data of wavelet coefficients, perform coefficient modeling and arithmetic coding, and checks the current size of coded image data so as to obtain desired sized coded image data, the image processing apparatus 10 according to the present invention performs the coefficient modeling and the arithmetic coding only once. Accordingly, the image processing apparatus 10 can obtain desired sized coded image data in a less processing time than the conventional image processing apparatuses.

Although the image processing apparatus 10 implements the coding process and the coded image data size adjustment process by using CPU 1, an image processing apparatus according to another embodiment of the present invention may implement a portion or all of theses processes by using a hardware circuit.

Furthermore, an image processing apparatus according to another embodiment of the present invention may perform the coding process and the coded image data size adjustment process separately on non-interlaced image data for each frame captured by the video camera 8. In this case, the image processing apparatus can also output desired sized coded image data. The image processing apparatus may allow a user to set a target data size (steps S20 through S23) prior to starting of the coding process in FIG. 5. In this case, the image processing apparatus can directly read data from the first and second memories 3 and 4 rather than HD 7 to perform the coded image data size adjustment process (S24 through S31) without storing in HD 7 coded image data and packet data pointers generated in the coding process. The image processing apparatus according to this embodiment can output desired sized coded image data in form of packet data even during capturing of a new frame by the video camera 8.

The image processing apparatus according to this embodiment may implement the above-mentioned process by using CPU 1. Alternatively, the image processing apparatus may implement a portion or all of the process by using a hardware circuit.

The present invention is not limited to the specifically disclosed embodiments, and variations and modifications may be made without departing from the scope of the present invention.

The present application is based on Japanese Patent Priority Application No. 2002-319483 filed Nov. 1, 2002, the entire contents of which are hereby incorporated by reference.

What is claimed is:

1. An image processing apparatus, comprising:
a coding part partitioning a wavelet coefficient obtained by performing two-dimensional discrete wavelet transform on image data into bit-planes and generating coded data of the image data by performing entropy coding on the wavelet coefficient for each of the bit-planes;
a first memory accommodating a size of a coded data portion generated from the wavelet coefficient for each of the bit-planes through the execution of the entropy coding;
a second memory accommodating the coded data of the image data;
a setting part setting a target size of the coded data; and
a data size adjustment part adjusting the size of the coded data such that the size of the coded data falls within an acceptable range, which includes the target size set by the setting part, by sequentially discarding a portion of the coded data in a least significant order from the second memory based on the size of the coded data portion corresponding to each of the bit-planes in the first memory.

2. The image processing apparatus as claimed in claim 1, wherein the image processing apparatus is based on JPEG2000.

3. The image processing apparatus as claimed in claim 2, wherein
the coding part partitions the wavelet coefficient into bit-planes for each code-block formed of a predetermined pixel matrix and generates the coded data of the image data by performing entropy coding on the wavelet coefficient for each of the bit-planes in accordance with the JPEG2000;
the first memory accommodates a storage address of a coded data portion corresponding to each code-block and a size of a coded data portion corresponding to each coding pass for each of the bit-planes of each code-block with respect to the coded data stored in the second memory; and
the data size adjustment part adjusts the size of the coded data such that the size of the coded data falls within an acceptable range including the target size of the coded data set by the setting part by subsequently discarding a portion of the coded data in a least significant order from the second memory based on the size of the coded data portion corresponding to each coding pass stored in the first memory.

4. An image processing method, comprising:
a coding step of partitioning a wavelet coefficient obtained by performing two-dimensional discrete wavelet transform on image data into bit-planes and generating coded data of the image data by performing entropy coding on the wavelet coefficient for each of the bit-planes;
a first storage step of accommodating a size of a coded data portion generated from the wavelet coefficient for each of the bit-planes through the execution of the entropy coding in a first memory;
a second storage step of accommodating the coded data of the image data in a second memory;
a setting step of setting a target size of the coded data; and
a data size adjustment step of adjusting the size of the coded data such that the size of the coded data falls within an acceptable range, which includes the target size set by the setting step, by sequentially discarding a portion of the coded data in a least significant order from the second memory based on the size of the coded data portion corresponding to each of the bit-planes in the first memory.

5. The image processing method as claimed in claim 4, wherein the image processing method is based on a JPEG2000.

6. The image processing method as claimed in claim 5, wherein
the coding step partitions the wavelet coefficient into bit-planes for each code-block formed of a predetermined pixel matrix and generates the coded data of the image data by performing entropy coding on the wavelet coefficient for each of the bit-planes in accordance with the JPEG2000;
the first storage step accommodates a storage address of a coded data portion corresponding to each code-block and a size of a coded data portion corresponding to each coding pass for each of the bit-planes of each code-block with respect to the coded data stored in the second memory; and
the data size adjustment step adjusts the size of the coded data such that the size of the coded data falls within an acceptable range including the target size of the coded data set by the setting step by subsequently discarding a portion of the coded data in a least significant order from the second memory based on the size of the coded data portion corresponding to each coding pass stored in the first memory.

7. The image processing apparatus of claim 1, wherein said coded data is data generated by performing entropy encoding, and a portion of the entropy-coded data.

8. The image processing apparatus of claim 1, wherein the size of the coded data is adjusted to fall within the acceptable range, without repeatedly performing entropy encoding.

9. The image processing apparatus as claimed in claim 1, wherein the size of the coded data is adjusted by said data size adjusting part to fall within the acceptable range, without repetition of coding, after generation of said coded data by said coding part.

10. An image processing apparatus comprising:
coding means for partitioning a wavelet coefficient obtained by performing two-dimensional discrete wavelet transform on image data into bit-planes and generating coded data of the image data by performing entropy coding on the wavelet coefficient for each of the bit-planes;
first storage means for accommodating a size of a coded data portion generated from the wavelet coefficient for each of the bit-planes through the execution of the entropy coding;
second storage means for accommodating the coded data of the image data;

setting means for setting a target size of the coded data; and data size adjustment means for adjusting the size of the coded data such that the adjusted size of the coded data falls within an acceptable range, which includes the target size set by the setting part, by sequentially discarding a portion of the coded data in a least significant order from the second memory based on the size of the coded data portion corresponding to each of the bit-planes in the first memory, wherein the size of the coded data is adjusted by said data size adjusting means to fall within the acceptable range, without repetition of coding, after generation of said coded data by said coding means.

* * * * *